July 26, 1949.  E. V. BERGSTROM  2,477,281
METHOD FOR HYDROCARBON CONVERSION
Filed March 10, 1947  2 Sheets-Sheet 2
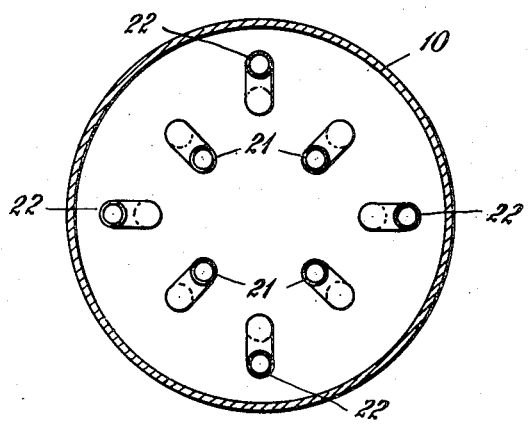
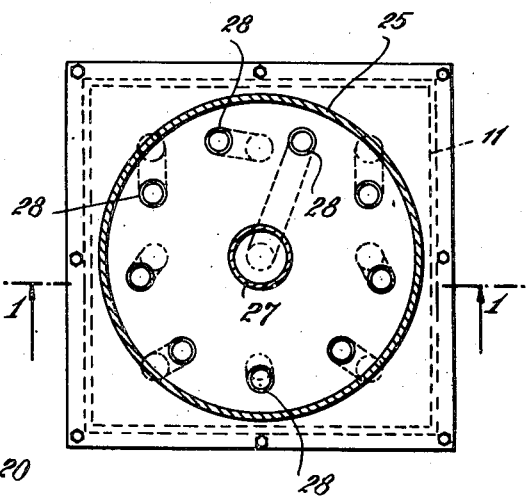
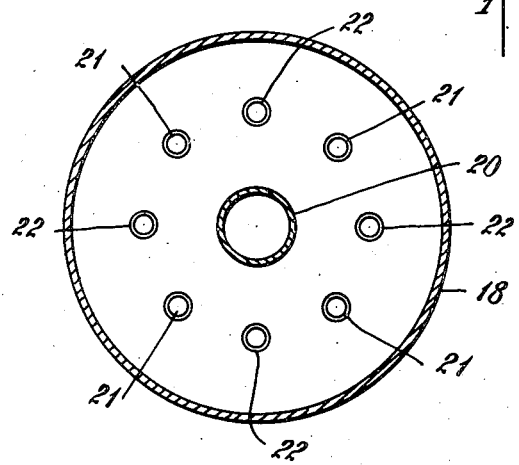
INVENTOR
ERIC V. BERGSTROM
BY
John A. Crowley, Jr.
AGENT OR ATTORNEY Patented July 26, 1949

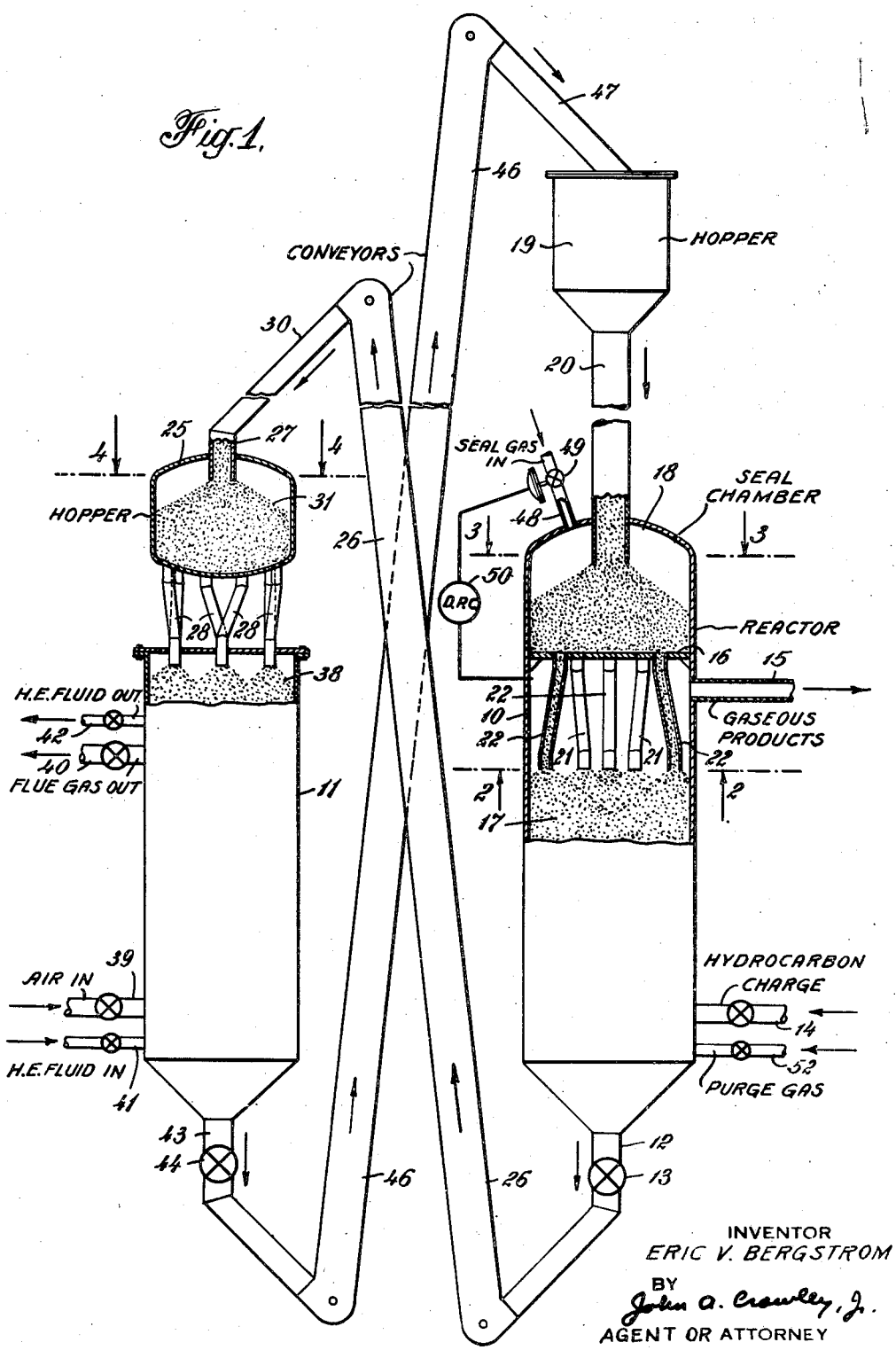

2,477,281

UNITED STATES PATENT OFFICE 2,477,281

METHOD FOR HYDROCARBON CONVERSION

Eric V. Bergstrom, Short Hills, N. J., assignor to Socony-Vacuum Oil Company, Incorporated, a corporation of New York Application March 10, 1947, Serial No. 733,481

3 Claims. (Cl. 196—52)

This invention pertains to systems wherein fluid reactants are contacted with moving beds of particle-form solid contact materials. It is particularly concerned with a cyclic system for conversion of fluid hydrocarbons in the presence of a substantially compact moving column.

Typical of such conversion processes is one wherein a particle-form adsorbent catalyst is moved cyclically through a conversion zone wherein it moves as a substantially compact column while being contacted with vaporized hydrocarbons for the purpose of converting them to lower boiling hydrocarbons such as gasoline and then through a regeneration zone wherein it moves as a substantially compact column while being contacted with a combustion supporting gas such as air to burn off from the catalyst carbonaceous contaminants deposited thereon in said conversion zone. This invention relates specifically to a method and apparatus for achieving uniform size distribution of contact material particles in the moving columns of solids in such systems.

In such catalytic moving-bed type systems the catalyst may partake of the nature of natural or treated clays, synthetic associations of silica, alumina or silica or alumina or inert carriers bearing deposits of certain metallic oxides and the like. The invention is not considered to be limited to catalytic conversion systems but is intended to cover thermal conversion systems and heat exchange systems and the like wherein a substantially inert particle-form solid material moves cyclically through two or more zones in at least some of which it flows by gravity as a substantially compact column. In such systems the contact material may take the form of particles of refractory material, or even of metal. In any event, the normal condition of the contact material as used commercially includes particles of varying sizes within a predetermined size range. For example, in the catalytic cracking of hydrocarbon oils the catalyst particles may desirably fall within the range about 4 to 20 mesh. A small amount of fines formed by attrition of the normal sized particles will also be present.

In such systems wherein the contact material made up of particles of varying size is moved cyclically through two or more zones there is a pronounced tendency for the particles in the moving stream in certain parts of the system to classify according to size. For example, when the contact material passes from an elevator discharge through a chute or conduit onto the surface of a bed or column thereof in a surge hopper or in the reactor or regenerator, classification tends to occur as the contact material distributes itself over the surface of the bed according to its angle of repose. When the contact material is delivered to a central point on the surface of the bed as is usually the case, the coarse particles tend to concentrate along the outer edges of the bed and the finer material in the laterally central portions of the bed.

This tendency for classification of particles of different sizes results in serious difficulties in such moving bed reaction systems. When the classification described above occurs on the top of the column in a reaction zone, or on the top of the surge zone feeding the reaction zone localized veins of concentrated fines may occur through the column in the reaction zone. Flow characteristics of a fluid medium passing through the column of contact material in the reaction zone will differ in different portions of the column cross section due to the classification of the granules. As a result non-uniform conversion of the hydrocarbon reactants is obtained and non-uniform coke deposits occur on the catalyst. In the regenerator the same difficulty arises and uneven regeneration of the catalyst results.

A major object of this invention is the provision, in a system wherein contact material of varying particle sizes is contacted as a substantially compact moving column with fluid reactants of a method for supplying contact material to said column across its entire horizontal cross-sectional area uniformly both with respect to size of particles and amount.

Another object of this invention is the provision in a cyclic moving column type hydrocarbon conversion system wherein granular catalysts pass cyclically through a reactor and regenerator of a method for supply of contact material particles of all sizes present substantially uniformly across the entire surface of each of said columns.

These and other objects of the invention will become apparent from the following discussion of the invention.

The invention may be most easily understood by reference to the drawings attached hereto of which Figure 1 is an elevational view, partially in section, showing the application of two forms of this invention to the reactor and regenerator in a continuous catalytic conversion system;

Figure 2 is a sectional plan view taken along line 2—2 of Figure 1;

Figure 3 is a sectional plan view taken along line 3—3 of Figure 1; and

Figure 4 is a sectional plan view taken along line 4—4 of Figure 1.

Turning now to Figure 1 we find a vertical reactor chamber 10 which is shown to be circular in cross-sectional shape, and a vertical regenerator 11 which is shown to be rectangular in cross-sectional shape, as will be seen from Figures 2 and 4. Each of these vessels may, if desired, be of other practical cross-sectional shape. A catalyst outlet conduit 12 bearing a flow control valve 13 connects into the bottom of the reactor 10. A fluid reactant inlet 14 connects into the lower section of reactor 10 and a fluid reactant outlet 15 connects into the upper section of the vessel 10. A partition 16 extends across the vessel 10 above the level of outlet 15 to divide vessel 10 into a lower conversion chamber 17 and an upper seal chamber 18. A supply hopper 19 is positioned above the vessel 10 and an elongated gravity feed leg 20 extends downwardly from hopper 19 and connects centrally through the top of seal chamber 18 to terminate within the upper section of chamber 18. Referring now to Figures 2 and 3 along with Figure 1, a plurality of conduits 21 and 22 connect into the partition 16 defining the bottom of chamber 18 at a plurality of spaced points arranged in a circle around a vertical axis corresponding to that of the feed leg 20. The conduits 21 and 22 extend downwardly into chamber 17 and terminate within the upper section thereof at a single level within the upper section thereof at a plurality of points substantially uniformly distributed across the horizontal cross-sectional area of the conversion chamber 17. In the arrangement shown the four tubes 21 which terminate on an inner radius are somewhat smaller on their lower ends than tubes 22 on the outer radius. It will be understood that the arrangement shown is somewhat simplified in order to avoid ambiguity in the drawing and that commercially other patterns may be followed for the arrangement of the lower ends of the tubes 21 and 22 across the chamber 17. The important requirement is that the conduits all terminate at the same level at points uniformly distributed over the entire horizontal area of chamber 17. In many arrangements all of these conduits may be of the same diameter. It will be noted that all of the conduits 21 and 22 connect into the partition 16 at points equidistant from the lower end of conduit 20.

A somewhat different arrangement is shown in connection with regenerator 10. Referring to Figures 1 and 4 in this connection it will be seen that a surge chamber 25 of circular cross-sectional shape is spaced above the top of the regenerator 11. Contact material enters the chamber 25 from conveyor 26 via the downwardly sloping chute 30 which connects into the conduit 27 which in turn extends centrally through the top of chamber 25. A plurality of tubes 28, nine in all, connect into the bottom of chamber 25 at spaced points arranged in a single circle sharing the same axis as the discharge end of conduit 27. The tubes 28 connect through the top of regenerator 11 and terminate at a single level in the upper section thereof at nine points uniformly distributed over the horizontal cross-sectional area of said regenerator. In operation spent contact material made up of particles of differing size is conducted upwardly by conveyor 26 which may be a continuous bucket elevator to the sloping chute 30. The contact material passes via chute 30 and conduit 27 onto the central portion of the surface of a bed 31 of contact material in chamber 25. The particles then move by gravity across the bed 31 seeking their normal angle of repose and in so doing tend to classify, the larger particles tending to concentrate on the outer periphery of the bed and the smaller particles concentrating in the central portion of the bed. If the contact material is withdrawn from the bottom of the bed 31 via a plurality of vertical conduits uniformly distributed across the bottom of chamber 25, on their upper ends and uniformly distributed across the chamber 11 on their lower ends, it will be apparent that the contact material delivered to the outer regions of the column 38 in vessel 11 will be high in large particles and that delivered to the central regions of the column will be high in fines. However, in the apparatus shown, each tube 28 is in exactly the same positional relationship with regards the lower end of conduit 27 as any other tube, so that in spite of the tendency for particles to classify in chamber 25, still the classification must be the same as regards all of the tubes 28. As a result the tubes 28 deliver to all sections of column 38 contact material made up of exactly the same range of particle sizes. The contact material moves downwardly by gravity in the column 38 and is contacted with air introduced at 39 and withdrawn at 40. A heat exchange fluid may be introduced via conduit 41 to heat transfer tubes (not shown) within vessel 11 to remove the heat of contaminant combustion from the regenerator. The heat exchange fluid may be withdrawn at 42. It will be understood that the regenerator construction may vary somewhat from that shown. For example, it may be divided into a vertical series of stages each having air inlets and flue gas outlets and separate cooling tube systems. In all cases the regeneration gas flows through the column of moving contact material particles. Regenerated contact material may be withdrawn from the bottom of vessel 11 via conduit 43 at a suitable rate controlled by valve 44. Since the flow through the regenerator is controlled by valve 44, the contact material column 38 is maintained substantially compact as is the bed 31 in chamber 25 and the flow in tubes 28. The hot regenerated catalyst existing, for example, at about 900-1000° F. is conveyed by conveyor 46 to the downwardly sloping chute 47 feeding hopper 19. Hopper 19 may be conveniently maintained at about atmospheric pressure. The contact material flows downwardly by gravity through leg 20 which is of sufficient length to create a head of contact material therein great enough to overcome the gaseous pressure in seal chamber 18. The gaseous pressure in seal chamber 18 is that of an inert gas such as steam or flue gas introduced to seal chamber 18 via conduit 48. The rate of such gas introduction is controlled by means of diaphragm operated valve 49 and differential pressure controller 50 slightly above that in the upper section of chamber 17. The contact material passes from chamber 18 to conversion chamber 17 as a plurality of compact streams in conduits 21 and 22. The contact material moves downwardly through the conversion chamber as a substantially compact column while hydrocarbon vapors introduced as gas oil, for example, at 14 pass upwardly through the column. Cracked hydrocarbon products are withdrawn from the reactor chamber at 15. The spent contact material is purged free of gaseous reactants by a suitable purge gas such as steam or flue gas introduced into the column via conduit 52 below the reactant inlet. Spent catalyst then passes from the reaction chamber through conduit 12 at a suitable rate controlled by valve 13.

It is emphasized that the effect of classification in chamber 25 may be overcome only when all of the tubes 28 are equidistant and symmetrically positioned with respect to the single locus of the contact material supply into the chamber 25.

The same applies to chamber 18 and the arrangement of tubes 21 and 22. It is further emphasized that the desired result requires a plurality of tubes 28 and cannot be accomplished in commercial apparatus by means of a single centrally positioned tube. The reason for this is that if uniformly mixed contact materials of differing particle sizes were delivered onto the surface of the column 38 in regenerator 11, for example through a single centrally located tube, the contact material in spreading out from that tube over the surface of column 38 will tend to classify so that the longer particles are on the outer edges of the column and the smaller particles are concentrated in the horizontally central areas of the column. It is only by the use of a plurality of supply tubes 28 delivering to a plurality of uniformly distributed points that the troublesome classification tendencies can be avoided.

It should be understood that the exact details of apparatus construction and of operational applications of this invention given hereinabove are intended as illustrative and are not to be construed as limiting the scope of this invention except as it is limited in the following claims.

I claim:

1. In a cyclic process for the conversion of hydrocarbons wherein a particle-form solid contact material is passed cyclically through a first reaction zone wherein it moves downwardly as a substantially compact column while being contacted with hydrocarbon reactants to effect the conversion thereof and through a second reaction zone wherein it moves downwardly as a substantially compact column while being contacted with a combustion supporting gas to burn off of the contact material carbonaceous material deposited thereon in the first reaction zone, the method for uniformly distributing the contact material onto the column thereof in either of said zones which comprises: maintaining a confined substantially compact bed of said contact material above the reaction zone, delivering a stream of said contact material to a central location on the surface of said bed, withdrawing a plurality of spaced confined, substantially compact streams of said contact material from the bottom of said bed from a plurality of points spaced equidistant from said central location and directing said plurality of confined compact streams onto the surface of said column in said reaction zone at a plurality of points substantially uniformly distributed over the horizontal cross-sectional area of said column and controlling the rate of flow in said compact streams by control of the rate of downward movement of the contact material in said column.

2. In a cyclic process for the conversion of hydrocarbons wherein a particle-form solid contact material is passed cyclically through a first reaction zone wherein it moves downwardly as a substantially compact column while being contacted with hydrocarbon reactants to effect the conversion thereof and through a second reaction zone wherein it moves downwardly as a substantially compact column while being contacted with a combustion supporting gas to burn off of the contact material carbonaceous material deposited thereon in the first reaction zone, the method for uniformly distributing the contact material onto the column thereof in either of said zones which comprises: maintaining a confined substantially compact bed of said contact material above the reaction zone, delivering a stream of said contact material to a single locus on the surface of said bed symmetrically located with respect the horizontal cross-sectional area of said bed, withdrawing a plurality of spaced confined, substantially compact streams of said contact material from the bottom of said bed from a plurality of spaced points all equidistant from said locus and directing said plurality of confined, compact streams onto the surface of said column in said reaction zone at a plurality of points substantially uniformly distributed over the horizontal cross-sectional area of said column and withdrawing contact material from the lower end of said column at a throttled rate so as to insure continuity of contact compactness through said column, compact streams and said bed.

3. A process for conversion of hydrocarbons in the presence of a moving contact material consisting of solid particles falling with a range of sizes, the method which comprises: maintaining a substantially compact column of downwardly moving particle-form contact material within a confined conversion zone, passing a fluid hydrocarbon charge into contact with said column under suitable conversion conditions to effect the conversion of said hydrocarbon charge to lower boiling gaseous hydrocarbon products, withdrawing said gaseous products from said column, maintaining a confined supply bed of said contact material above said conversion zone, maintaining a second confined bed of said contact material intermediate said first bed and said conversion zone, passing contact material as a confined substantially compact gravity flowing stream from said first bed onto the surface of said second bed at a point centrally located with respect its horizontal cross-sectional area, downwardly withdrawing contact material as a plurality of spaced compact streams from the bottom of said second bed from a plurality of points arranged horizontally in a circle which is symmetrical with respect the point of delivery of contact material onto said second bed, and directing said plurality of confined streams onto the surface of said column in said reaction zone at a plurality of points substantially uniformly distributed over the horizontal cross-sectional area of said column, withdrawing contact material at a controlled rate from the lower end of said column so as to maintain continuity of contact material stream compactness extending upwardly through said column, said confined streams and said second bed, and maintaining a blanket of substantially inert gas over said second confined bed at a pressure above the pressure in the upper section of said conversion zone.

ERIC V. BERGSTROM.

REFERENCES CITED

The following references are of record in the file of this patent:

UNITED STATES PATENTS

| Number | Name | Date |
|---|---|---|
| 955,614 | Stone et al. | Apr. 19, 1910 |
| 2,410,309 | Simpson et al. | Oct. 29, 1946 |
| 2,438,261 | Utterback | Mar. 23, 1948 |
| 2,441,311 | Crowley, Jr., et al. | May 11, 1948 |